(12) United States Patent
Liu

(10) Patent No.: US 9,100,907 B2
(45) Date of Patent: Aug. 4, 2015

(54) METHOD, DEVICE AND SYSTEM FOR ESTABLISHING ON-DEMAND ROUTE

(75) Inventor: Yongjun Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 13/367,137

(22) Filed: Feb. 6, 2012

(65) Prior Publication Data

US 2012/0134298 A1    May 31, 2012

Related U.S. Application Data

(63) Continuation of application No. PCT/CN2010/075780, filed on Aug. 6, 2010.

(30) Foreign Application Priority Data

Aug. 6, 2009  (CN) .......................... 2009 1 0165615

(51) Int. Cl.
*H04W 40/28* (2009.01)
*H04L 12/721* (2013.01)
*H04W 40/24* (2009.01)
*H04L 12/701* (2013.01)

(52) U.S. Cl.
CPC ............... *H04W 40/28* (2013.01); *H04L 45/14* (2013.01); *H04W 40/242* (2013.01); *H04L 45/00* (2013.01)

(58) Field of Classification Search
CPC ... H04W 40/246; H04W 84/18; H04W 40/02; H04W 40/24; H04W 40/242; H04W 40/28; H04W 48/08; H04L 45/00; H04L 45/123; H04L 45/02

USPC .......... 370/229, 230, 235, 254, 351, 389, 392; 709/223, 225, 226
See application file for complete search history.

(56) References Cited

U.S. PATENT DOCUMENTS

| | | | |
|---|---|---|---|
| 6,954,435 B2 | 10/2005 | Billhartz et al. | |
| 7,177,295 B1 * | 2/2007 | Sholander et al. | ............ 370/338 |
| 7,408,911 B2 * | 8/2008 | Joshi | ............................ 370/338 |

(Continued)

FOREIGN PATENT DOCUMENTS

| | | | |
|---|---|---|---|
| CN | 1650573 A | 8/2005 | |
| CN | 1761232 A | 4/2006 | |

(Continued)

OTHER PUBLICATIONS

First Chinese Office Action and Translation received in Chinese Application No. 200910165615.9, mailed Jul. 3, 2012, 6 pages.

(Continued)

*Primary Examiner* — Gary Mui
*Assistant Examiner* — Michael Phillips
(74) *Attorney, Agent, or Firm* — Slater & Matsil, L.L.P.

(57) ABSTRACT

The present invention relates to the field of network communication technologies, and discloses a method, a device, and a system for establishing an on-demand route. The method includes: determining that a stable route needs to be established; establishing the stable route and recording a route entry corresponding to the stable route in a route table; determining an effective time of the stable route, in which the effective time of the stable route is longer than the effective time of another common route; and performing an aging operation on the route entry according to the effective time of the stable route.

3 Claims, 3 Drawing Sheets

(56) References Cited

U.S. PATENT DOCUMENTS

| | | | |
|---|---|---|---|
| 2002/0122410 | A1* | 9/2002 | Kulikov et al. ............... 370/349 |
| 2003/0027577 | A1* | 2/2003 | Brown et al. ................. 455/445 |
| 2003/0045295 | A1* | 3/2003 | Stanforth ..................... 455/445 |
| 2003/0202476 | A1 | 10/2003 | Billhartz et al. |
| 2003/0202512 | A1* | 10/2003 | Kennedy ...................... 370/389 |
| 2005/0129000 | A1 | 6/2005 | Sivakumar et al. |
| 2005/0286464 | A1* | 12/2005 | Saadawi et al. ............... 370/328 |
| 2007/0150615 | A1* | 6/2007 | Walter et al. .................. 709/238 |
| 2007/0153737 | A1* | 7/2007 | Singh et al. ................... 370/331 |
| 2008/0089315 | A1 | 4/2008 | Westphal et al. |
| 2008/0232390 | A1* | 9/2008 | Nakata .......................... 370/439 |
| 2008/0310340 | A1* | 12/2008 | Isozu ............................. 370/328 |
| 2009/0052321 | A1* | 2/2009 | Kamath ........................ 370/235 |
| 2009/0135824 | A1* | 5/2009 | Liu ............................... 370/392 |
| 2009/0168653 | A1* | 7/2009 | St. Pierre et al. ............. 370/238 |
| 2012/0134298 | A1 | 5/2012 | Liu |
| 2014/0307614 | A1* | 10/2014 | Ruiz et al. .................... 370/312 |

FOREIGN PATENT DOCUMENTS

| | | |
|---|---|---|
| CN | 1937576 A | 3/2007 |
| CN | 101217497 A | 7/2008 |
| CN | 101990270 A | 3/2011 |
| JP | 2005-072720 A | 3/2005 |
| JP | 2005-524311 A | 8/2005 |

OTHER PUBLICATIONS

Supplementary European Search Report received in European Application No. 10806057.5, mailed Jun. 28, 2012, 6 pages.
International Search Report received in Patent Cooperation Treaty Application No. PCT/CN2010/075780, mailed Nov. 11, 2010, 4 pages.
Written Opinion of the International Searching Authority received in Patent Cooperation Treaty Application No. PCT/CN2010/075780, mailed Nov. 11, 2010, 4 pages.
Agarwal, Sulabh, et al., "Route-Lifetime Assessment Based Routing (RABR) Protocol for Mobile Ad-Hoc Networks," IEEE International Conference on Communications, New Orleans, LA, Jun. 18-21, 2000, pp. 1697-1701.
Lv, Qiu-Dong, et al., "Route-Lifetime Estimation Based Dynamic Source Routing," Microprocessors, No. 5, Oct. 2006. pp. 38-41.
Pandian, R., et al., "Enhanced Routing Protocol for Video Transmission Over Mobile Adhoc Network," Journal of Applied Science Research, 2006, pp. 336-340.
Yuan, Li, et al., "Distance Vector Routing Algorithm Based on State Stability Update," Computer Engineering, vol. 33, No, 12, Jun. 2007, 12 pages.
Second Office Action of Chinese Application No. 200910165615.9 mailed Mar. 4, 2013, 15 pages. (Partial Translation).
Notice of Reasons for Rejection received in Application No. 2012-523193 mailed Jun. 4, 2013, 13 pages.
Su, William et al., "Mobility Prediction and Routing in Ad Hoc Wireless Network," Computer Science Department, University of California, Los Angeles, CA, Feb. 28, 2001, 33 pages.
Zhong, Xiaofeng, et al., "Stable Enhancement for AODV Routing Protocol," 14th IEEE 2003 International Symposium on Personal, Indoor Mobile Radio Communication Proceedings, 2003, pp. 201-205.

* cited by examiner

METHOD, DEVICE AND SYSTEM FOR ESTABLISHING ON-DEMAND ROUTE

CROSS-REFERENCE TO RELATED APPLICATIONS

This application is a continuation of International Application No. PCT/CN2010/075780, filed on Aug. 6, 2010, which claims priority to Chinese Patent Application No. 200910165615.9, filed on Aug. 6, 2009, both of which are hereby incorporated by reference in their entireties.

FIELD OF THE INVENTION

The present invention relates to the field of communication technologies, and in particular, to a method, a device, and a system for establishing an on-demand route.

BACKGROUND OF THE INVENTION

In a wireless sensor network or an ad hoc network, the environment for node communication and node location may often change, so data is generally distributed by using an on-demand routing manner. The basic idea of the on-demand routing is to establish a route according to a demand of sending data packets.

In the prior art, an AODV (Ad hoc On-Demand Vector, Ad hoc On-Demand Vector) routing algorithm is a common on-demand routing method. According to this method, a source node broadcasts a route request command in the beginning. Different commands broadcasted reach a destination node through different routes. The destination node selects the route of the lowest cost as a final route. In the AODV, each route in a route entry is distributed and stored on each node in the route. In other words, each node stores only an address of a next-hop node that is passed through to reach the destination node.

Since the storage capability of the network node is limited, and especially for the wireless sensor network, the cost of the node is low and the storage capability of the node is poorer, and the number of network nodes is large, so not all the route entries are stored generally. Moreover, since the route may change, an aging operation should be performed on the stored route entry, that is, the route entry obtained after route discovery has an effective time. The effective time is generally preset and obtained when the node joins in the network. For one node, a uniform effective time is used for all route entries. The route entry may be deleted after the effective time is exceeded, so that more space may be adapted for storing new route entries. If the source node tries to communicate with the destination node after the route entry is deleted, a route discovery process needs to be initiated again to re-establish the route.

Currently, the application of the network bearer becomes more diverse, especially for the wireless sensor network. According to the prior art, the uniform aging operation is performed on all the route entries. In this case, actual available route entries may be deleted.

SUMMARY OF THE INVENTION

The embodiments of the present invention provide a method, a device, and a system for establishing an on-demand route, so that the demands of different applications on the delay may be satisfied in the route, and the consumption of the network bandwidth may be reduced.

An embodiment of the present invention provides a method for establishing an on-demand route, where the method includes:
  determining that a stable route needs to be established;
  establishing the stable route and recording a route entry corresponding to the stable route in a route table;
  determining an effective time of the stable route, in which the effective time of the stable route is longer than the effective time of another common route; and
  performing an aging operation on the route entry according to the effective time of the stable route.

An embodiment of the present invention provides a network node device, where the network node device includes:
  a route determining unit, configured to determine that a stable route needs to be established;
  a route establishing unit, configured to establish the stable route after the route determining unit determines that the stable route needs to be established;
  a recording unit, configured to record a route entry corresponding to the stable route in a route table;
  an effective time determining unit, configured to determine an effective time of the stable route, in which the effective time of the stable route is longer than the effective time of another common route; and
  a route maintaining unit, configured to perform an aging operation on the route entry according to the effective time of the stable route.

An embodiment of the present invention provides a network node device, where the network node device includes:
  a command receiving unit, configured to receive a route request command, in which the route request command carries an accumulative cost parameter;
  a calculating unit, configured to determine a route effective time according to the accumulative cost parameter; and
  a command sending unit, configured to send a route reply command, in which the reply command carries the route effective time.

An embodiment of the present invention provides a system for establishing an on-demand route, where the system includes a source node, an intermediate node, and a destination node, in which:
  the source node is configured to send a route request command to the intermediate node, in which the route request command carries indication information indicating that a stable route entry needs to be established;
  the intermediate node is configured to receive the route request command, establish a stable route to the destination node according to the indication information, and record a route entry corresponding to the stable route in a route table;
  the source node is further configured to record the route entry corresponding to the stable route in the route table according to a route reply command returned by the intermediate node; and
  the source node and the intermediate node are further configured to determine an effective time of the stable route and perform an aging operation on the route entry according to the effective time of the stable route, in which the effective time of the stable route is longer than the effective time of another common route.

Through the method, the device, and the system for establishing an on-demand route according to the embodiments of the present invention, if it is determined that a stable route needs to be established, the stable route is established and a route entry corresponding to the stable route is recorded in a route table; an effective time of the stable route is determined, in which the effective time of the stable route is longer than the effective time of another common route; and an aging operation is performed on the route entry according to the effective time of the stable route. Therefore, a slower aging operation may be performed on the stable route entry than that performed on another common route entry. In this case, not only the demands of different applications on the delay may be satisfied, but also the consumption of the network bandwidth may be effectively reduced since a route discovery does not need to be frequently performed due to the stable route.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art may derive other drawings from the accompanying drawings without creative efforts.

DETAILED DESCRIPTION OF THE EMBODIMENTS

In order to enable persons skilled in the art to understand the technical solutions of the present invention better, the present invention are described in further detail below with reference to embodiments and the accompanying drawings.

Different requirements for quality of service (QoS) may need to be satisfied in different applications, and different intermediate routers may require different effective time of route entries. Different QoS requirements may need to be satisfied in different applications, and different intermediate routers may require different effective time of route entries. Since a route discovery consumes a lot of time and some applications have a strict requirement for a delay after running, for example, a control application, the delay generated by the route discovery cannot satisfy the requirement for this application. Furthermore, excessive route discoveries may cause excessive consumption of network bandwidth.

In the method, the device and the system for establishing an on-demand route according to the embodiments of the present invention, for different mobility of each network node and different communication environments, during establishing a route on demand, it is determined that a stable route needs to be established according to different applications; a stable route discovery is performed, in which the stable route is established and a route entry corresponding to the stable route is recorded in a route table; the effective time of the stable route is determined, in which the effective time of the stable route is longer than the effective time of another common route; and an aging operation is performed on the route entry according to the effective time of the stable route. Definitely, if the stable route does not need to be established, the route discovery may be performed according to the prior art.

Figure 1:
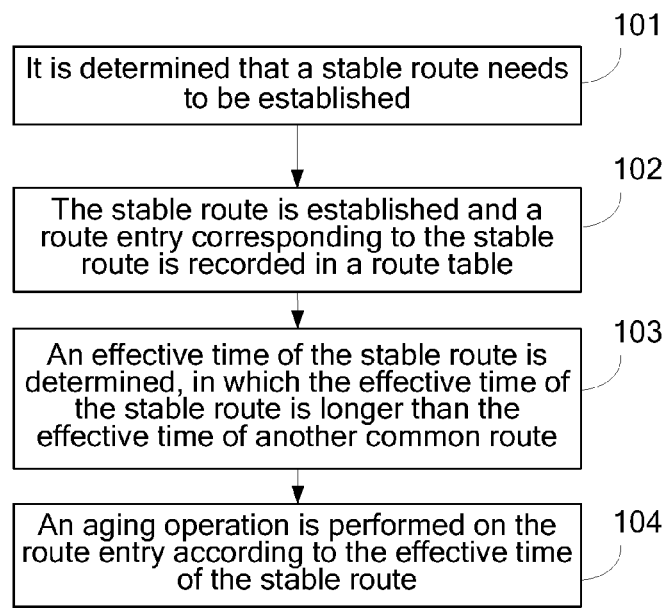
FIG. 1 is a flow chart of a method for establishing an on-demand route according to an embodiment of the present invention.

FIG. 1 is a flow chart of a method for establishing an on-demand route according to an embodiment of the present invention. The method includes the following steps.

Step 101: It is determined that a stable route needs to be established.

Step 102: The stable route is established and a route entry corresponding to the stable route is recorded in a route table.

Figure 2:
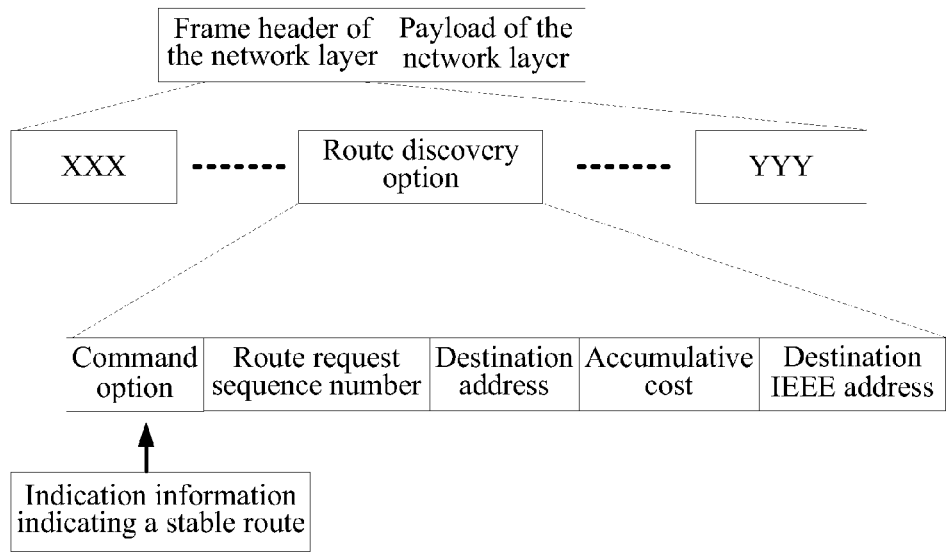
FIG. 2 is a schematic view of a format of a route request command according to an embodiment of the present invention.

A source node may determine that the stable route needs to be established according to application requirements. During the route discovery, the source node sends a notification to an intermediate node. Specifically, a route request command in the prior art may be adopted, and a command option is added in a data packet of the network layer to indicate establishment of the stable route, as shown in FIG. 2.

In a route discovery option of a frame header of the data packet, information similar to the route request command in the prior art is included as follows: a route request sequence number, a destination address, an accumulative cost, and a destination IEEE address. In addition, the indication information indicating a stable route discovery is added to indicate that the stable route needs to be established.

Definitely, other dedicated commands may also be adopted during the route discovery, which are not limited in the present invention.

The process of establishing the stable route is similar to the route establishment process in the prior art. During the process, the source node broadcasts the route request command in the beginning. Different broadcast commands reach a destination node through different routes. The destination node selects the route of the lowest cost as a final route. The specific process is as follows.

If a node receiving the route request command is not the destination node and does not store the route entry of the destination node, the node determines, according to the indication information, that a stable route discovery needs to be initiated, and establishes the stable route.

In the case that the intermediate node does not store the route entry of the destination node, if the intermediate node does not receive the same route request command before, the intermediate node records the route request command, adds this link cost to the accumulative cost, records a backward route, that is, a path for returning to the source node, and then rebroadcasts the route request command; if the same route request command is received before, the accumulative cost in the received route request command is compared with the previously recorded accumulative cost. If the accumulative cost in the received route request command is lower, the route request command is rebroadcast after updating the accumulative cost and the backward route; otherwise, the received route request command is discarded.

In the case that the node receiving the route request command is the destination node or stores the route entry of the destination node, if the node does not receive the same route request command before, the node records the route request command, adds this link cost to the accumulative cost, records a backward route, and then returns a route reply command, in which the route reply command is sent to the source node along the recorded backward route; if the same route request command is received before, the accumulative cost in the received route request command is compared with the previously recorded accumulative cost. If the accumulative cost in the received route request command is lower, the route reply command is returned after updating the accumulative cost and the backward route; otherwise, the received route request command is discarded.

The immediate node and the source node record a forward route entry when receiving the route reply command for the first time, and the immediate node needs to update the accumulative cost in the route reply command and forward the route reply command, and compare the cost of the previously recorded route entry with the cost in the received route reply command when receiving the same route reply command later. If the cost in the received route reply command is lower, the route entry is updated. The immediate node needs to update the accumulative cost in the route reply command and continue forwarding the route reply command.

If the source node receives the route reply command within a specified time, the route from the source node to the destination node is established.

For the convenience of being distinguished from another common route, the route table entry corresponding to the established stable route may be labeled as a stable route entry in the route table when recording the forward route and the backward route.

Step 103: An effective time of the stable route is determined, in which the effective time of the stable route is longer than the effective time of another common route.

In the embodiment of the present invention, the effective time of the stable route entry is different from the effective time of another common route entry and may be a predetermined value, which is longer than the effective time of another common route, so that the node may perform a slower aging operation on the stable route entry. The node is informed of the effective time when joining in the network, that is, the source node and the intermediate node may determine the effective time of the stable route according to configuration information.

Moreover, information indicating the effective time of the stable route may also be carried in the route request command. For example, a field indicating the effective time is added in the route request command shown in FIG. 2. In this way, the immediate node may determine the effective time of the stable route according to the information indicating the effective time of the stable route in the field.

The effective time of the stable route may be an infinitely long time. For example, a special value of 0xffffffff may be specified to express the infinitely long time. In this case, a first-in-first-out method may be adopted to delete the route entry. If a new stable route entry exists, the route entry that expires first or is saved first is deleted. Alternatively, the source node sends a route deletion command to the destination node, and then all nodes along the route delete the corresponding stored route entry.

Furthermore, the stable route should be borne on the stable node, and factors affecting the stability mainly include mobility of the node and a communication environment surrounding the node. Therefore, in the embodiment of the present invention, the effective time of the stable route may be determined in the following manner.

A stability degree parameter is set for each node. Specifically, the stability degree may be determined according to the mobility of the node and the communication environment surrounding the node. For example, a cardinal number may be set according to the mobility of the node. For example, the cardinal number of a stationary node is 0xff, the cardinal number of a slowly moving node is 0x9f, and the cardinal number of a fast moving node is 0x3f. Then the cardinal number may be adjusted according to the communication environment surrounding the node, such as the interference, noise, and conflict. The communication environment may be measured according to the quality of a link and a success ratio of communication. For example, the number 4 is subtracted from the cardinal number each time the success ratio of communication is reduced by 1% until the cardinal number is 0. The finally obtained value is taken as the stability degree parameter. Different stability degree parameters may also be set for different neighboring nodes since the communication environments and the success ratios of communication with different neighboring nodes are different.

The intermediate node takes a preset stability degree parameter of the intermediate node as a parameter for calculating the link cost after receiving the route request command and updates the accumulative cost in the route request command after calculating the link cost. For example, in the prior art, the calculated link cost C is from 1 to 7, and the stability degree parameter S is from 0x00 to 0xff, that is, from 0 to 255. The calculated final link cost may be specified as $NC=[(C-[S/32]+8)/2]$, where $[x]$ denotes the greatest integer that is not greater than x. The link cost is $NC=[(3-[200/32]+8)/2]=2$ if the following condition is satisfied: $C=3$ and $S=200$. As such, the destination node may determine the effective time of the stable route according to a final total accumulative cost when generating a route reply. In one embodiment, a mapping relation between an accumulative cost parameter and the effective time of the stable route may be set, and the effective time of the stable route is determined according to the accumulative cost parameter carried in the received route request command and the mapping relation. Persons of ordinary skill in the art may further adopt other methods to determine the effective time of the stable route according to the accumulative cost parameter. In this way, each node on the path may save the effective time of the stable route after receiving the route reply.

Step 104: An aging operation is performed on the route entry according to the effective time of the stable route.

It should be noted that, in the above embodiment, the preset stability degree parameter may be taken as an exclusive condition no matter which manner is adopted to determine the effective time of the stable route. Specifically, during establishing the stable route, after the node receives the route request command, if the predetermined stability degree of the node is lower than a preset threshold, the route request command is discarded and is not forwarded, so as to ensure that all the nodes in the final established route are stable. To prevent route establishment failure when a route in which all nodes are stable does not exist, the node of the stability degree lower than the preset threshold may also forward a normal route request command after receiving a stable route request command, that is, the route request command does not carry the indication information indicating that the stable route entry needs to be established. In this way, the destination node prefers to select the stable route when selecting the route. The route is determined according to the route information carried in the stable route request command, and then the route reply command is sent. A normal route is selected only if the stable route does not exist.

Definitely, in the embodiment of the present invention, the set stability degree parameter may be taken as both the exclusive condition and the parameter for calculating the link cost. For example, it is specified that the stability degree parameter S is from 1 to 255 and a stability degree threshold is 144. In the prior art, the calculated link cost C is from 1 to 7. The calculated final link cost may be specified as $NC=[(C-[S/16]+16)/$ 2], where [x] denotes the greatest integer that is not greater than x. The link cost is NC=[(3-[200/16]+16)/2]=3 if the following condition is satisfied: C=3 and S=200.

It may be seen that, in the method for establishing an on-demand route according to the embodiment of the present invention, the stable route is established and the route entry corresponding to the stable route is recorded in the route table; the effective time of the stable route is determined, in which the effective time of the stable route is longer than the effective time of another common route; and the aging operation is performed on the route entry according to the effective time of the stable route. Therefore, a slower aging operation may be performed on the stable route entry than that performed on another common route entry. In this case, not only the requirements of different applications on the delay may be satisfied, but also the consumption of the network bandwidth may be effectively reduced since a route discovery does not need to be frequently performed due to the stable route.

Persons of ordinary skill in the art should understand that all or part of the steps in the method according to the embodiment of the present invention may be implemented by a program instructing relevant hardware, and the program may be stored in a computer readable storage medium, such as a Read-Only Memory/Random Access Memory (ROM/RAM), a magnetic disk, or an optical disk.

Figure 3:
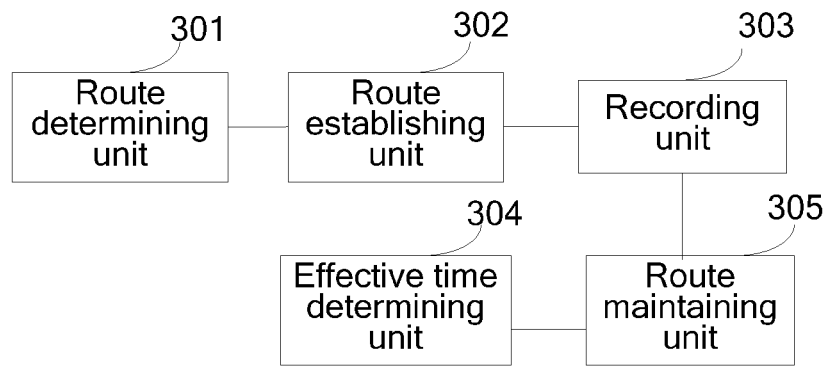
FIG. 3 is a schematic structural view of a network node device according to an embodiment of the present invention.

An embodiment of the present invention further provides a network node device. FIG. 3 is a schematic structural view of the network node device.

The network node device includes a route determining unit 301, a route establishing unit 302, a recording unit 303, an effective time determining unit 304, and a route maintaining unit 305.

The route determining unit 301 is configured to determine that a stable route needs to be established.

The route establishing unit 302 is configured to establish the stable route after the route determining unit 301 determines that the stable route needs to be established.

The recording unit 303 is configured to record a route entry corresponding to the stable route in a route table.

The effective time determining unit 304 is configured to determine an effective time of the stable route, in which the effective time of the stable route is longer than the effective time of another common route.

The route maintaining unit 305 is configured to perform an aging operation on the route entry according to the effective time of the stable route.

The network node device according to the embodiment of the present invention may be taken as a route source node or a route destination node and performs a slower aging operation on the stable route entry than that performed on another common route entry. In this case, not only the requirements of different applications on the delay may be satisfied, but also the consumption of the network bandwidth may be effectively reduced since a route discovery does not need to be frequently performed due to the stable route.

Figure 4:
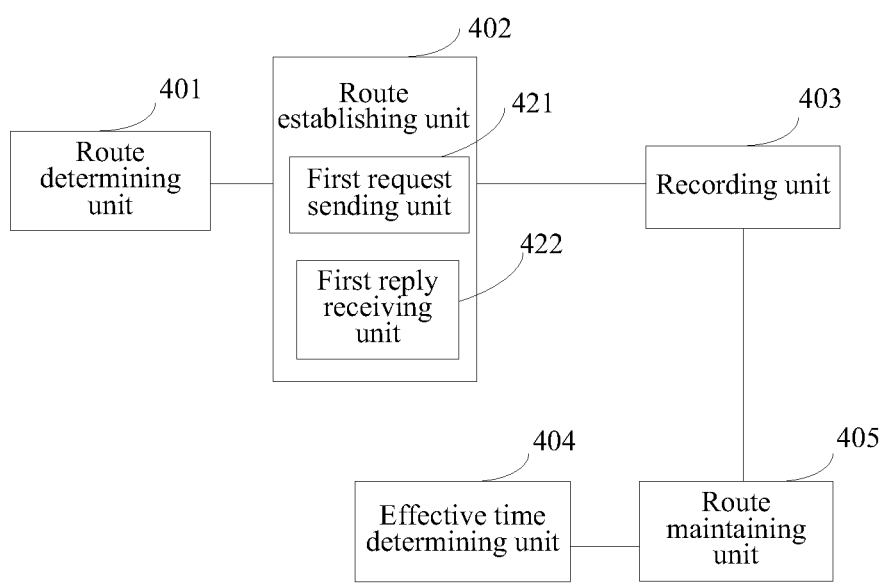
FIG. 4 is another schematic structural view of a network node device according to an embodiment of the present invention.

FIG. 4 is another schematic structural view of a network node device according to an embodiment of the present invention.

The network node device includes a route determining unit 401, a route establishing unit 402, a recording unit 403, an effective time determining unit 404, and a route maintaining unit 405.

The route determining unit 401 is configured to determine whether a stable route needs to be established according to requirements of an application layer.

The route establishing unit 402 is configured to establish the stable route after the route determining unit 401 determines that the stable route needs to be established. Specifically, as shown in FIG. 4, the route establishing unit 402 includes a first request sending unit 421 and a first reply receiving unit 422. The first request sending unit 421 is configured to send a route request command after the route determining unit 401 determines that the stable route needs to be established, in which the route request command carries indication information indicating that a stable route entry needs to be established. The first reply receiving unit 422 is configured to receive a route reply command returned by another node.

The recording unit 403 is configured to record a route entry corresponding to the stable route in a route table according to the route reply command.

The effective time determining unit 404 is configured to determine an effective time of the stable route, in which the effective time of the stable route is longer than the effective time of another common route.

The route maintaining unit 405 is configured to perform an aging operation on the route entry according to the effective time of the stable route.

In the embodiment of the present invention, the effective time determining unit 404 may determine the effective time of the stable route according to various means, such as, the following means mentioned in the method for establishing an on-demand route according to the embodiment of the present invention:

In Means 1, the effective time of the stable route is determined according to configuration information.

In Means 2, the effective time of the stable route is obtained according to the received route reply command, in which the effective time of the stable route is carried in the route reply command and determined by a destination node according to an accumulative cost parameter carried in the received route request command.

In Means 1, the route request command sent by the first request sending unit 421 may also carry information indicating the effective time of the stable route, so that an intermediate node determines the effective time of the stable route according to the information. Definitely, in this means, the route request command may also not carry the information indicating the effective time of the stable route, and the intermediate node determines the effective time of the stable route according to the configuration information.

For the detailed process of obtaining the effective time of the stable route by Means 2, reference may be made to the description of the method for establishing an on-demand route according to the embodiment of the present invention, so that the details will not be described herein again.

The network node device according to the embodiment of the present invention may be taken as a source node, establishes the stable route according to requirements of the application layer, and performs a slower aging operation on the stable route entry than that performed on another common route entry. In this case, not only the requirements of different applications on the delay may be satisfied, but also the consumption of the network bandwidth may be effectively reduced since a route discovery does not need to be frequently performed due to the stable route.

Figure 5:
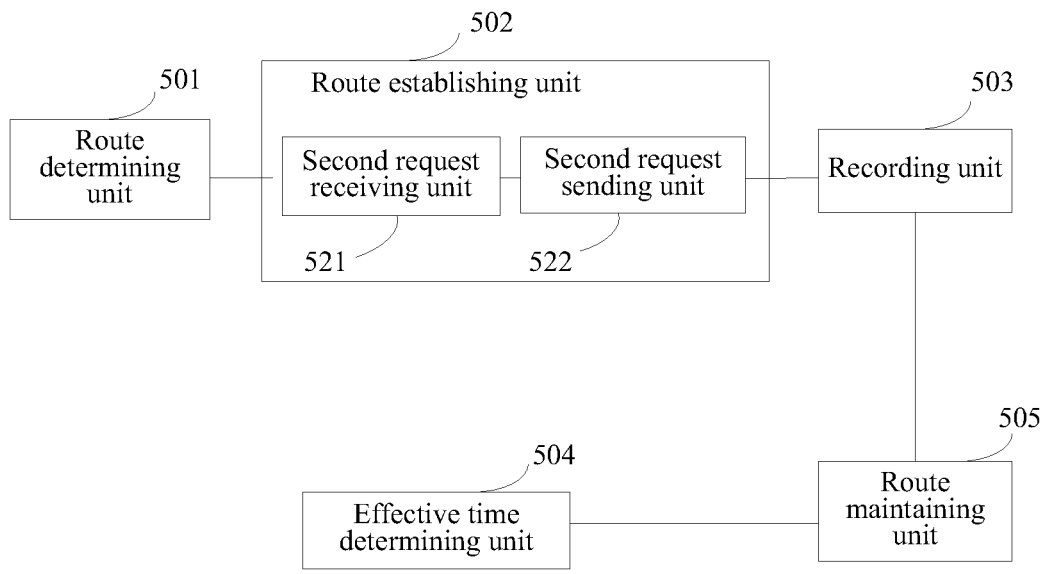
FIG. 5 is another schematic structural view of a network node device according to an embodiment of the present invention.

FIG. 5 is another schematic structural view of a network node device according to an embodiment of the present invention.

The network node device includes a route determining unit 501, a route establishing unit 502, a recording unit 503, an effective time determining unit 504, and a route maintaining unit 505.

The route determining unit 501 is configured to determine that a stable route needs to be established. Specifically, the determination is made according to indication information carried in a route request command received by the route establishing unit 502 indicating that a stable route entry needs to be established.

The route establishing unit 502 is configured to establish the stable route after the route determining unit 501 determines that the stable route needs to be established. Specifically, as shown in FIG. 5, the route establishing unit 502 includes a second request receiving unit 521 and a second request sending unit 522. The second request receiving unit 521 is configured to receive the route request command, in which the route request command carries the indication information indicating that the stable route entry needs to be established. The second request sending unit 522 is configured to send the route request command to a next node.

The recording unit 503 is configured to record a route entry corresponding to the stable route in a route table according to a received route reply command.

The effective time determining unit 504 is configured to determine an effective time of the stable route, in which the effective time of the stable route is longer than the effective time of another common route.

The route maintaining unit 505 is configured to perform an aging operation on the route entry according to the effective time of the stable route.

In the embodiment of the present invention, the effective time determining unit 504 may determine the effective time of the stable route according to various means, such as, the following means mentioned in the method for establishing an on-demand route according to the embodiment of the present invention.

In Means 1, the effective time of the stable route is determined according to configuration information.

In Means 2, the route request command also carries information indicating the effective time of the stable route.

In this case, the second request receiving unit 521 is further configured to receive the route request command carrying the information indicating the effective time of the stable route. In this way, the effective time determining unit 504 may determine the effective time of the stable route according to the information indicating the effective time of the stable route carried in the route request command.

In Means 3, the effective time of the stable route is obtained according to the received route reply command, in which the effective time of the stable route is carried in the route reply command and determined by a destination node according to an accumulative cost parameter carried in the received route request command.

In this case, the second request receiving unit 521 is further configured to receive the route request command carrying the accumulative cost parameter. The route establishing unit 502 may further include a link cost calculating unit (not shown), configured to take a predetermined stability degree of the node as a parameter for calculating a link cost to calculate the link cost after the second request receiving unit 521 receives the route request command and take the calculated link cost as the accumulative cost parameter in the route request command forwarded by the second request sending unit. The effective time determining unit 504 is specifically configured to obtain the effective time of the stable route according to the received route reply command, in which the effective time of the stable route is carried in the route reply command and determined by a destination node according to the accumulative cost parameter carried in the received route request command.

For the detailed process of obtaining the effective time of the stable route by Means 3, reference may be made to the description of the method for establishing an on-demand route according to the embodiment of the present invention, so that the details will not be described herein again.

The network node device according to the embodiment of the present invention may be taken as an intermediate node, establishes the stable route according to the received route request command, and performs a slower aging operation on the stable route entry than that performed on another common route entry. In this case, not only the demands of different applications on the delay may be satisfied, but also the consumption of the network bandwidth may be effectively reduced since a route discovery does not need to be frequently performed due to the stable route.

It should be noted that, in the above embodiment, the route establishing unit 502 may further include a judging unit (not shown), configured to judge whether the predetermined stability degree of the node is lower than a preset threshold after the second request receiving unit 521 receives the route request command. If the predetermined stability degree of the node is lower than the preset threshold, a notification is sent to the second request receiving unit 521, and after receiving the notification, the second request receiving unit 521 does not forward the received route request command or forwards the received route request command that does not carry the indication information.

In this way, it may be ensured that all the nodes in the final established route are stable or that a common route may be selected if a route in which all nodes are stable does not exist.

Figure 6:
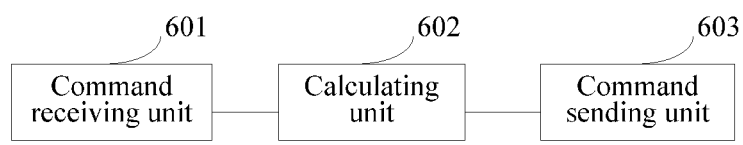
FIG. 6 is another schematic structural view of a network node device according to an embodiment of the present invention.

An embodiment of the present invention further provides a network node device. FIG. 6 is a schematic structural view of the network node device.

In this embodiment, the network node device includes a command receiving unit 601, a calculating unit 602, and a command sending unit 603.

The command receiving unit 601 is configured to receive a route request command, in which the route request command carries an accumulative cost parameter.

The calculating unit 602 is configured to determine a route effective time according to the accumulative cost parameter.

The command sending unit 603 is configured to send a route reply command, in which the reply command carries the route effective time.

The network node device according to the embodiment of the present invention may be taken as a destination node, determines the route effective time according to the accumulative cost parameter carried in the received route request command, carries the route effective time in the reply command so that an intermediate node and a source node may perform an aging operation on the route entry corresponding to the route effective time, so as to perform a slower aging operation on a stable route entry than that performed on another common route entry. In this case, not only the requirements of different applications on the delay may be satisfied, but also the consumption of the network bandwidth may be effectively reduced since a route discovery does not need to be frequently performed due to the stable route.

Figure 7:
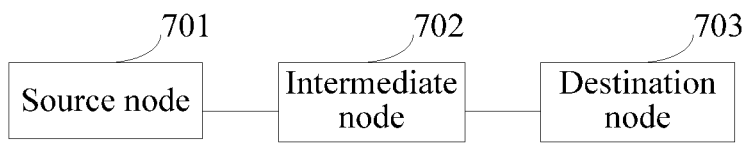
FIG. 7 is a schematic structural view of a system for establishing an on-demand route according to an embodiment of the present invention.

An embodiment of the present invention further provides a system for establishing an on-demand route. FIG. 7 is a schematic structural view of the system.

In this embodiment, the system includes a source node 701, an intermediate node 702, and a destination node 703.

The source node 701 is configured to send a route request command to the intermediate node 702, in which the route request command carries indication information indicating that a stable route entry needs to be established.

The intermediate node 702 is configured to receive the route request command, establish a stable route to the destination node 703 according to the indication information, and record a route entry corresponding to the stable route in a route table.

The source node 701 is further configured to record the route entry corresponding to the stable route in the route table according to a route reply command returned by the intermediate node 702.

The source node 701 and the intermediate node 702 are further configured to determine an effective time of the stable route and perform an aging operation on the route entry according to the effective time of the stable route, in which the effective time of the stable route is longer than the effective time of another common route.

Definitely, the system according to the embodiment of the present invention is not limited to the above structure. For example, the system may have multiple intermediate nodes.

Furthermore, in specific applications, the source node 701 and the intermediate node 702 may determine the effective time of the stable route according to configuration information and may also obtain the effective time of the stable route according to the received route reply command, in which the effective time of the stable route is carried in the route reply command and determined by the destination node according to an accumulative cost parameter carried in the received route request command.

For the detailed structure of each node, reference may be made to the description of the network node device according to the embodiment of the present invention, so that the details will not be described herein again.

The system for establishing an on-demand route according to the embodiment of the present invention may establish the stable route, record the route entry corresponding to the stable route in the route table, and perform a slower aging operation on the stable route entry than that performed on another common route entry. In this case, not only the requirements of different applications on the delay may be satisfied, but also the consumption of the network bandwidth may be effectively reduced since a route discovery does not need to be frequently performed due to the stable route.

The embodiments of the present invention are describes in detail above. The implementation of the present invention is described herein through specific examples. The description about the embodiments of the present invention is merely provided for ease of understanding of the method and device of the present invention. Persons of ordinary skill in the art may make variations and modifications to the present invention in terms of the specific implementations and application scopes according to the ideas of the present invention. Therefore, the specification shall not be construed as a limit to the present invention.

Persons of ordinary skill in the art should understand that part of the steps of the method according to the embodiments of the present invention may be implemented by a program instructing relevant hardware. The program may be stored in a computer readable storage medium. When the program is run, one or a combination of the steps of the method according to the embodiments of the present invention are performed.

In addition, the functional units in each embodiment of the present invention may be integrated in one processing module, or each unit exists separately, or two or more units are integrated in one processing module. The integrated module may be embodied in the form of hardware or a software functional module. If the integrated module is embodied in the form of a software functional module and is sold or used as a separate product, the integrated module may be stored in a computer readable storage medium.

The storage medium may be a Read-Only Memory (ROM), a magnetic disk, or a Compact Disk Read-Only Memory (CD-ROM).

In conclusion, the above are merely specific embodiments of the present invention. However, the scope of the present invention is not limited thereto. Changes or replacements readily apparent to persons skilled in the art within the technical scope of the present invention should fall within the protection scope of the present invention. Therefore, the protection scope of the present invention is subject to the appended claims.

What is claimed is:

1. A method for establishing an on-demand route, the method comprising:
   determining, by a network node, stability degree of the network node according to mobility of the network node and a communication environment surrounding the network node;
   determining, by the network node, whether the stability degree of the network node is lower than a preset threshold, and when the stability degree of the network node is not lower than the preset threshold and when the stability degree of the network node is lower than the preset threshold;
   receiving, by the network node, a first route request command from a source node, wherein the first route request command carries a first indication information indicating that a stable route needs to be established and a second indication information indicating effective time of a route entry of the stable route, wherein the effective time of the route entry of the stable route is longer than the effective time of a route entry of another common route of the network node;
   determining, by the network node, that the stable route needs to be established according to the first route request command;
   transmitting, by the network node, the first route request command to a destination node;
   receiving, by the network node, a route reply command from the destination node;
   recording, by the network node, the route entry corresponding to the stable route in a route table according to the route reply command;
   determining, by the network node, effective time of the route entry corresponding to the stable route according to the second indication information;
   performing, by the network node, an aging operation on the route entry corresponding to the stable route according to the effective time of the route entry corresponding to the stable route; and
   transmitting, by the network node, a second route request command to the destination node when the stability degree of the network node is determined to be lower than the preset threshold, wherein the second route request command does not carry the first indication information.

2. A network node, comprising a processor, a receiver and a transmitter,
   the processor being configured to determine stability degree of the network node according to mobility of the network node and a communication environment surrounding the network node;
   the processor being configured to determine whether the stability degree of the network node is lower than a preset threshold, and when the stability degree of the network node is not lower than the preset threshold and when the stability degree of the network node is lower than the preset threshold, the receiver being configured to receive a first route request command from a source node, wherein the first route request command carries a first indication information indicating that a stable route needs to be established and a second indication information indicating effective time of a route entry of the stable route, wherein the effective time of the route entry of the stable route is longer than the effective time of a route entry of another common route of the network node;

the processor being configured to determine that the stable route needs to be established according to the first route request command;

the transmitter being configured to transmit the first route request command to a destination node;

the receiver being configured to receive a route reply command from the destination node;

the processor being configured to record a route entry corresponding to the stable route in a route table according to the route reply command;

the processor being configured to determine effective time of the route entry corresponding to the stable route according to the second indication information, and perform an aging operation on the route entry corresponding to the stable route according to the effective time of the route entry corresponding to the stable route; and wherein, when the stability degree of the network node is determined to be lower than the preset threshold, the transmitter is configured to transmit a second route request command to the destination node, and wherein the second route request command does not carry the first indication information.

3. A system for establishing an on-demand route, the system comprising:

a source node, at least one intermediate node, and a destination node, wherein the intermediate node is configured to determine stability degree of a network node according to mobility of the intermediate node and a communication environment surrounding the intermediate node;

wherein the intermediate node is configured to determine whether the stability degree of the intermediate node is lower than a preset threshold, and when the stability degree of the intermediate node is not lower than the preset threshold and when the stability degree of the intermediate node is lower than the preset threshold, wherein the intermediate node is configured to receive a first route request command from the source node, wherein the first route request command carries a first indication information indicating that a stable route needs to be established and a second indication information indicating effective time of a route entry of the stable route, wherein the effective time of the route entry of the stable route is longer than the effective time of a route entry of another common route of the intermediate node, wherein the intermediate node is configured to determine the stable route needs to be established according to the first route request command, wherein the intermediate node is configured to transmit the first route request command to the destination node, wherein the intermediate node is configured to receive a route reply command from the destination node, wherein the intermediate node is configured to record a route entry corresponding to the stable route in a route table according to the route reply command, and wherein the intermediate node is configured to determine effective time of the route entry corresponding to the stable route according to the second indication information, and perform an aging operation on the route entry corresponding to the stable route according to the effective time of the route entry corresponding to the stable route; and wherein, when the stability degree of the intermediate node is determined to be lower than the preset threshold, the intermediate node is configured to transmit a second route request command to the destination node, and wherein the second route request command does not carry the first indication information.

* * * * *